United States Patent
Sasaki

(10) Patent No.: US 9,919,475 B2
(45) Date of Patent: Mar. 20, 2018

(54) THREE-DIMENSIONAL PRINTING APPARATUS, THREE-DIMENSIONAL OBJECT FORMING METHOD, AND THREE-DIMENSIONAL OBJECT

(71) Applicant: Takafumi Sasaki, Kanagawa (JP)

(72) Inventor: Takafumi Sasaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/849,861

(22) Filed: Sep. 10, 2015

(65) Prior Publication Data

US 2016/0075085 A1    Mar. 17, 2016

(30) Foreign Application Priority Data

Sep. 16, 2014    (JP) ................................. 2014-187339

(51) Int. Cl.
*B29C 67/00*    (2017.01)
*B22F 3/00*    (2006.01)
(Continued)

(52) U.S. Cl.
CPC .......... *B29C 67/0081* (2013.01); *B22F 3/008* (2013.01); *B27N 5/00* (2013.01); *B28B 1/001* (2013.01); *B33Y 10/00* (2014.12); *B29L 2031/04* (2013.01); *B29L 2031/14* (2013.01); *B33Y 30/00* (2014.12); *B33Y 80/00* (2014.12)

(58) Field of Classification Search
CPC ....... B29C 67/0081; B22F 3/008; B27N 5/00; B33Y 10/00; B33Y 30/00; B33Y 80/00; B28B 1/001; B29L 2031/14; B29L 2031/04

USPC .... 425/174.4, 375; 264/40.1, 113, 497, 460, 264/461, 463, 308, 109
See application file for complete search history.

(56) References Cited

U.S. PATENT DOCUMENTS

| | | | | |
|---|---|---|---|---|
| 4,339,405 A | * | 7/1982 | Paszner ..................... | C08K 3/32 264/108 |
| 5,387,380 A | * | 2/1995 | Cima ...................... | B05C 19/04 264/109 |

(Continued)

FOREIGN PATENT DOCUMENTS

| | | |
|---|---|---|
| JP | 2005-059324 | 3/2005 |
| JP | 4522619 | 8/2010 |

(Continued)

OTHER PUBLICATIONS

Feb. 8, 2016 European Search Report in corresponding European Patent Application No. EP 15184701.9.

*Primary Examiner* — Nahida Sultana
(74) *Attorney, Agent, or Firm* — Cooper & Dunham LLP

(57) ABSTRACT

A three-dimensional printing apparatus for forming a three-dimensional object is provided. The three-dimensional printing apparatus includes a forming unit to supply a powder to form a powder layer and a head to eject liquid droplets of a forming liquid onto the powder layer to bond particles of the powder layer to form a forming layer. The forming unit and the head form laminated forming layers by sequentially repeating forming the powder layer and ejecting the forming liquid to form a between-layers vacant space formed between the two successive forming layers sequentially laminated in the laminating direction.

8 Claims, 17 Drawing Sheets

(51) Int. Cl.
B27N 5/00 (2006.01)
B28B 1/00 (2006.01)
B33Y 10/00 (2015.01)
B33Y 30/00 (2015.01)
B33Y 80/00 (2015.01)
B29L 31/04 (2006.01)
B29L 31/14 (2006.01)

(56) References Cited

U.S. PATENT DOCUMENTS

| | | | |
|---|---|---|---|
| 6,547,994 B1 | 4/2003 | Monkhouse et al. | |
| 6,599,018 B2 | 7/2003 | Maruyama et al. | |
| 8,057,101 B2 | 11/2011 | Shimizu et al. | |
| 8,550,802 B2* | 10/2013 | Fuwa | B22F 3/1055 264/497 |
| 2002/0145213 A1* | 10/2002 | Liu | B29C 67/0081 264/40.1 |
| 2005/0074596 A1* | 4/2005 | Nielsen | B29C 67/0059 428/304.4 |
| 2007/0029698 A1* | 2/2007 | Rynerson | B22F 3/1055 264/219 |
| 2007/0126157 A1* | 6/2007 | Bredt | B29C 67/0077 264/334 |
| 2013/0053095 A1 | 2/2013 | Hashimoto et al. | |
| 2013/0064707 A1* | 3/2013 | Matsui | B29C 67/0081 419/61 |
| 2013/0241095 A1* | 9/2013 | Korten | A61C 13/0018 264/16 |
| 2014/0227123 A1* | 8/2014 | Gunster | B22F 3/008 419/1 |
| 2015/0099102 A1* | 4/2015 | Sullivan | B29C 67/0055 428/206 |
| 2015/0108677 A1* | 4/2015 | Mark | B29C 67/0055 264/138 |
| 2016/0177122 A1* | 6/2016 | Naruse | C09D 129/04 264/128 |
| 2016/0375676 A1* | 12/2016 | Ritchie | B29C 67/0051 428/29 |

FOREIGN PATENT DOCUMENTS

| | | |
|---|---|---|
| JP | 5217078 | 6/2013 |
| JP | 5397487 | 1/2014 |
| JP | 5408207 | 2/2014 |
| JP | 5408221 | 2/2014 |
| WO | WO00/29202 | 5/2000 |
| WO | WO2013/113248 A1 | 8/2013 |

* cited by examiner

THREE-DIMENSIONAL PRINTING APPARATUS, THREE-DIMENSIONAL OBJECT FORMING METHOD, AND THREE-DIMENSIONAL OBJECT

BACKGROUND OF THE INVENTION

1. Field of the Invention

The present invention generally relates to a three-dimensional printing apparatus, a three-dimensional object forming method, and a three-dimensional object.

2. Description of the Related Art

As a three-dimensional printing apparatus (three-dimension imaging apparatus) for producing a three-dimensional object, an apparatus is known which produces a three-dimensional object using a lamination-based imaging method. In the lamination-based imaging method, for example, a flattened powder layer of a metal or a non-metal is formed on a forming stage, a forming liquid is ejected from a head onto the formed powder layer, a thin layer of a forming layer made of the bonded powder is formed, another powder layer is formed on the forming layer, the process of forming a forming layer is repeated, and a three-dimensional object is produced by laminating the forming layers.

Conventionally, a method is known in which a filling rate indicating a density of a forming material or a mixing ratio of a plurality of forming materials, from which filling rate or from which mixing ratio a three-dimensional object of the same weight as the three-dimensional target object can be produced, is calculated based on shape information and weight information of a three-dimensional target object and weight information of one or more forming materials obtained from a forming material database; forming information for laminating the forming materials is created according to the calculated filling rate or the calculated mixing ratio; and the forming materials are laminated according to the forming information (refer to Patent Document 1).

However, if a forming layer with a honeycomb structure or a sponge structure is formed in order to vary the filling rate which indicates the density of the forming material, then many changes need to be applied to the original forming data, which may create a problem that the shape of the final form of the three-dimensional object itself may change.

The present invention has been made in view of the above problems, and whose objective is to obtain a three-dimensional object with a simple structure internally including a low density part and a high density part.

CITATION LIST

Patent Document

[Patent Document 1] Japanese Patent No. 5408207

SUMMARY OF THE INVENTION

In order to solve the above problems, a three-dimensional printing apparatus for forming a three-dimensional object is provided. The three-dimensional printing apparatus includes a forming unit to supply a powder to form a powder layer and a head to eject liquid droplets of a forming liquid onto the powder layer to bond particles of the powder layer to form a forming layer. The forming unit and the head form laminated forming layers by sequentially repeating forming the powder layer and ejecting the forming liquid to form a between-layers vacant space formed between the two successive forming layers sequentially laminated in the laminating direction.

According to the present invention, a three-dimensional object with a simple structure internally including a low density part and a high density part can be obtained.

DESCRIPTION OF THE PREFERRED EMBODIMENTS

Figure 1:
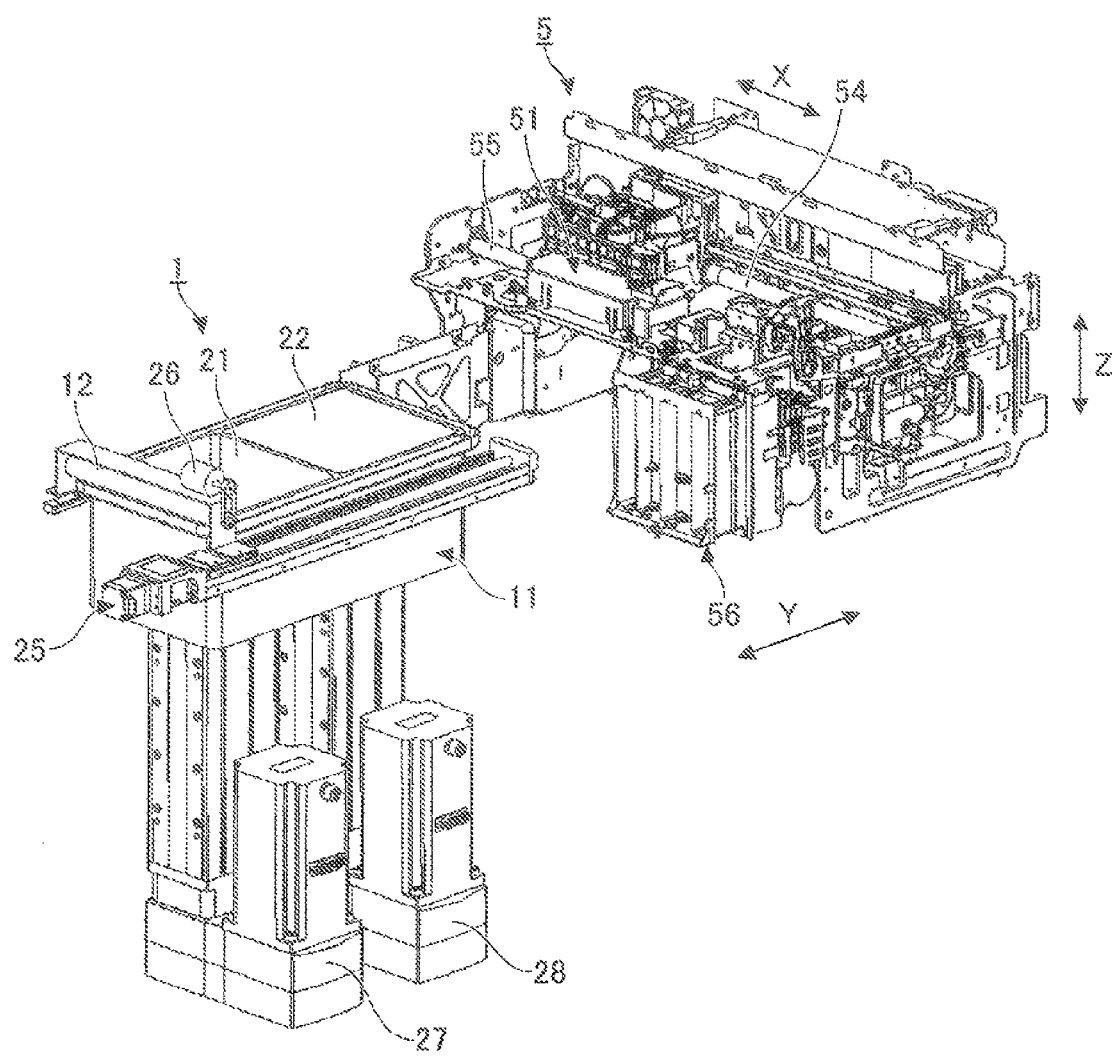
FIG. 1 is a main section perspective view of a first example of a three-dimensional printing apparatus according to the present invention.
Figure 2:
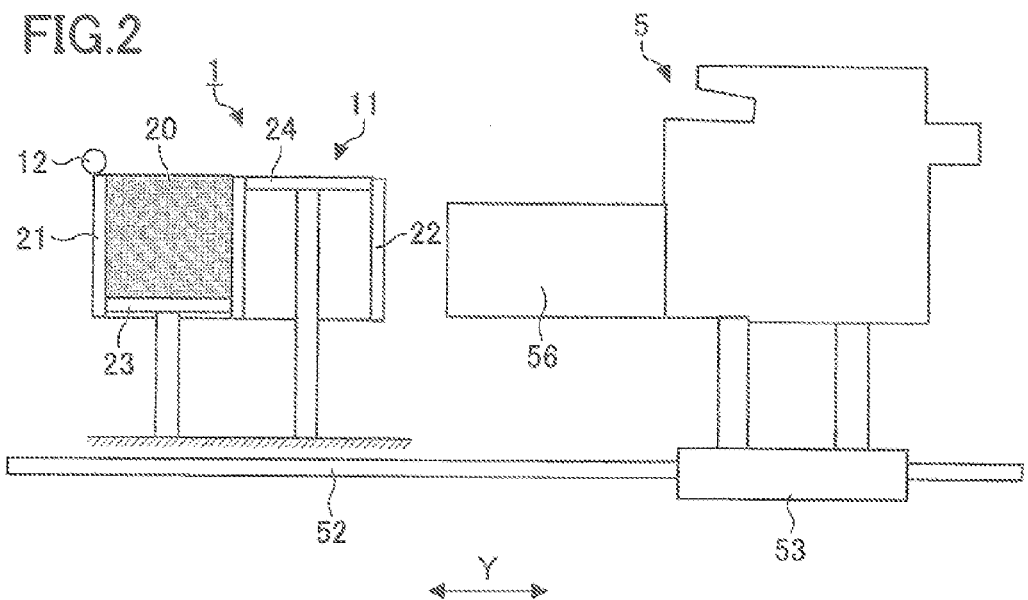
FIG. 2 is a schematic side view of the same.
Figure 3:
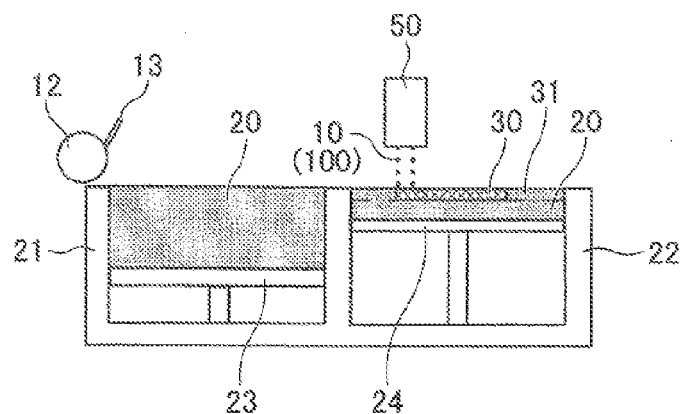
FIG. 3 is a cross-sectional view of a forming part.
Figure 4:
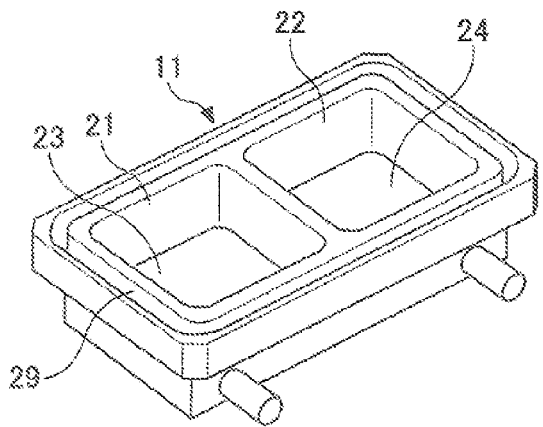
FIG. 4 is a perspective view of the forming part.

In the following, embodiments of the present invention will be described referring to the accompanying drawings. A first example of a three-dimensional printing apparatus according to the present invention will be described referring to FIGS. 1-4. FIG. 1 is a main section perspective view of a powder lamination-based imaging apparatus according to the present invention. FIG. 2 is a schematic side view of the same. FIG. 3 is a cross-sectional view of a forming part. FIG. 4 is a perspective view of the forming part. It should be noted that FIG. 3 shows the view in a forming process.

This three-dimensional printing apparatus is a powder imaging apparatus (also referred to a fine powder imaging apparatus) which includes a forming part 1 in which a forming layer made of bonded powder is formed and a forming unit 5 in which a three-dimensional object is produced by ejecting forming liquid 10 onto the forming part 1.

The forming part 1 includes, for example, a powder tank 11, and a flattening roller 12 (also referred to as a recoater roller) which is a rotating body as a flattening unit.

The powder tank 11 includes a supplying tank 21 for supplying powder 20 and a forming tank 22 in which a three-dimensional object is produced. A bottom part of the supplying tank 21 as a supplying stage 23 is capable of moving up and down in the vertical direction (height direction). Similarly, a bottom part of the forming tank 22 as a forming stage 24 is capable of moving up and down in the vertical direction (height direction). A three-dimensional object is produced on the forming stage 24.

The supplying stage 23 is moved up and down by a motor 27. The forming stage 24 is moved up and down by a motor 28.

The flattening roller 12 supplies the powder 20 which has been supplied onto the supplying stage 23 of the supplying tank 21 to the forming tank 22 and forms a powder layer 31 by a flattening process which will be described later. The flattening roller 12 is, due to a reciprocating mechanism 25, capable of moving back and forth relative to a stage surface of the forming stage 24 (the surface on which the powder 20 is loaded) in a direction indicated by an arrow Y which is a direction along the stage surface of the forming stage 24, and is rotationally driven by a motor 26.

The forming unit 5 includes, as shown in FIG. 3, an ejection head unit 51 with one or more liquid ejection heads 50 (hereinafter referred to as "heads") which eject forming liquid 10 onto the powder layer 31 on the forming stage 24.

The ejection head unit 51 includes a head for ejecting a cyan forming liquid, a head for ejecting a magenta forming liquid, a head for ejecting a yellow forming liquid, a head for ejecting a black forming liquid, and a head for ejecting a clear forming liquid. Each of the cyan forming liquid, the magenta forming liquid, the yellow forming liquid, the black forming liquid, and the clear forming liquid is contained in a corresponding tank of a plurality of tanks, which are installed in a tank installation part 56.

It should be noted that the forming unit 5 also includes a head cleaning mechanism (a cleaning device 555 in FIG. 5) for cleaning the ejection head unit 51.

The head cleaning mechanism (device) is composed primarily of a cap and a wiper. The cap is brought into close contact with a nozzle surface and the forming liquid is suctioned from the nozzle in order to discharge powder which is stuck in the nozzle or to discharge forming liquid with highly increased viscosity. Then, wiping is performed on the nozzle surface in order to form a meniscus in the nozzle (inside of the nozzle is in a negative pressure state). Also, the head cleaning mechanism prevents the powder from going inside the nozzle or prevents the forming liquid from drying by covering the nozzle surface of the head in the case where the forming liquid ejection is not performed.

The forming unit 5 includes, as shown in FIG. 2, a slider part 53 which is movably held by a guiding member 52, and the entire forming unit 5 is capable of reciprocating in a direction indicated by the arrow Y (sub-scanning direction). The entire forming unit 5 is reciprocated in the direction indicated by the arrow Y by a scanning mechanism including a motor 552, which will be described later.

The ejection head unit 51 is supported by guiding members 54 and 55, is capable of reciprocating in a direction indicated by an arrow X, and is reciprocated in the X direction by a scanning mechanism including a motor 550, which will be described later.

The ejection head unit 51 together with the guiding members 54 and 55 is supported in such a way that it is capable of moving up and down in a direction indicated by an arrow Z, and is moved up and down in the Z direction by an up-and-down mechanism including a motor 551 which will be described later.

Here, the forming part 1 will be described in detail referring to above-described FIG. 3 and FIG. 4.

The powder tank 11 has a box shape, and includes the supplying tank 21 and the forming tank 22, whose upper surfaces are open. The supplying stage 23 is arranged inside of the supplying tank 21, and the forming stage 24 is arranged inside of the forming tank 22, each of which is capable of moving up and down.

Sides of the supplying stage 23 are arranged to touch internal surfaces of the supplying tank 21. Sides of the forming stage 24 are arranged to touch internal surfaces of the forming tank 22. Upper surfaces of the supplying stage 23 and the forming stage 24 are kept horizontal.

A powder chute 29 is arranged around the powder tank 11 as shown in FIG. 4, which has a concave shape and upper surface of which is open (omitted in FIG. 3). Surplus powder 20, which is accumulated by the flattening roller 12 when forming a powder layer, falls into the powder chute 29. The surplus powder 20 which has fallen into the powder chute 29 is returned into a powder supplying part (not shown) which supplies powder to the supplying tank 21.

It should be noted that the powder supplying device (not shown in FIG. 1)(a powder supplying unit or a powder supplying device 554 in FIG. 5) has a tank shape and is arranged above the supplying tank 21. In the case of initial operation of the forming, or in the case where the amount of powder in the supplying tank 21 is decreased, the powder in the tank (powder supplying device) is supplied to the supplying tank 21. Regarding a powder conveyance method for supplying powder, there is a screw conveyance method using a screw or a pneumatic conveyance method using air.

The flattening roller 12 has a function of forming a powder layer 31 with predetermined thickness by conveying and supplying the powder 20 from the supplying tank 21 to the forming tank 22.

The flattening roller 12 is a rod-like member which is longer than an inside dimension of the forming tank 22 and the supplying tank 21 (i.e., width of a part in which powder is supplied or a part in which powder is prepared), and is reciprocated in a direction along the stage surface (in the direction indicated by the arrow Y which is parallel to the stage surface) by the reciprocating mechanism 25 described above.

The flattening roller 12, while being rotated by the motor 26, horizontally moves from outside of the supplying tank 21 and passes over the supplying tank 21 and the forming tank 22, thereby the powder 20 is moved and supplied onto the forming tank 22.

Also, as shown in FIG. 3, a powder removing plate 13 is arranged which is a powder removing member for removing the powder 20 attached to the flattening roller 12 by contacting a circumferential surface of the flattening roller 12.

The powder removing plate 13 moves with the flattening roller 12 while being in contact with the circumferential surface of the flattening roller 12. Also, the powder removing plate 13 is arranged in a direction which is a counter direction of a rotating direction of the flattening roller 12 during a flattening process.

Although, in the present embodiment, the powder tank 11 of the forming part 1 is configured to include two tanks of the supplying tank 21 and the forming tank 22, the powder tank 11 may be configured to include the forming tank 22 alone and the powder is supplied from the powder supplying device to the forming tank 22 for the flattening process by the flattening unit.

Figure 5:
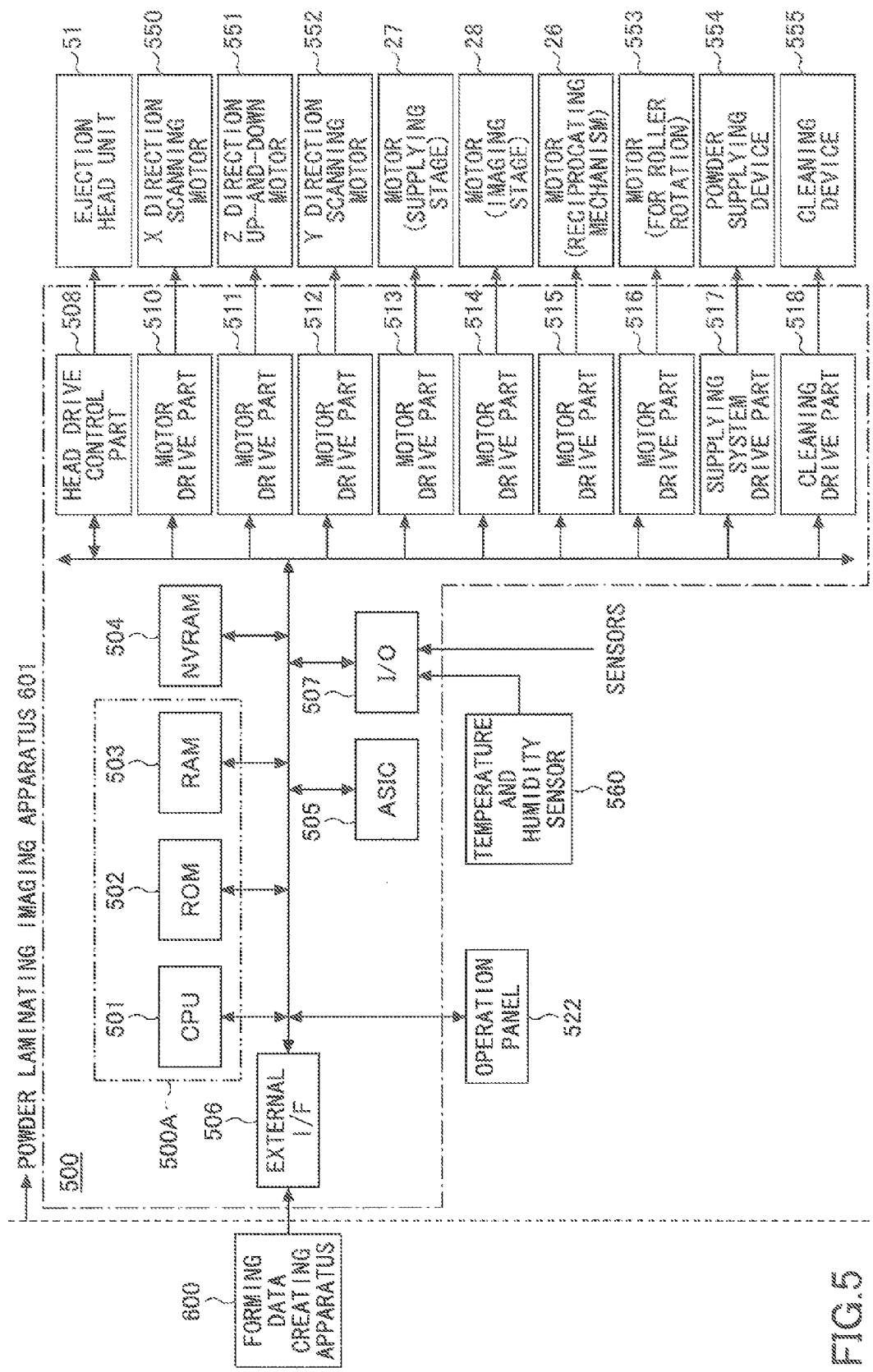
FIG. 5 is a block diagram of a control part.

Next, an overview of a control part of the three-dimensional printing apparatus will be described referring to FIG. 5. FIG. 5 is a block diagram of a control part 500.

The control part 500 has a main control part 500A including a CPU 501 which controls the entire three-dimensional printing apparatus, a ROM 502 which stores a program executed by the CPU 501 and other fixed data, and a RAM 503 which temporarily stores image data (print data), etc.

The control part 500 has a non-volatile memory (NVRAM) 504 for retaining data even when the power of the apparatus is shut off. Also, the control part 500 has an ASIC 505 for performing image processing including various kinds of signal processing for image data, and other input-output signal processing for controlling the entire apparatus.

The control part 500 has an I/F 506 for sending/receiving data and signals used for receiving forming data from an external forming data creating apparatus 600. It should be noted that the forming data creating apparatus 600 is an apparatus for creating forming data in which the final form of the three-dimensional object is sliced into forming layers, and is configured with an information processing apparatus such as a personal computer.

The control part 500 has an I/O 507 for receiving detected signals of various sensors.

The control part 500 has a head drive control part 508 for driving and controlling each head of the ejecting head unit 51.

The control part 500 has a motor drive part 510 for driving the X direction scanning motor 550 which moves the ejecting head unit 51 in the arrow X direction and a motor drive part 512 for driving the Y direction scanning motor 552 which moves the forming unit 5 in the arrow Y direction.

The control part 500 has a motor drive part 511 for driving a Z direction up-and-down motor 551 which moves (up-and-down) the ejecting head unit 51 in the arrow Z direction. It should be noted that, instead of the ejecting head unit 51, the entire forming unit 5 may be moved up and down in the arrow Z direction.

The control part 500 has a motor drive part 513 for driving the motor 27 which moves up and down the supplying stage 23 and a motor drive part 514 for driving the motor 28 which moves up and down the forming stage 24.

The control part 500 has a motor drive part 515 for driving the motor 26 of the reciprocating mechanism 25 which moves the flattening roller 12 and a motor drive part 516 for driving a motor 553 for rotationally driving the flattening roller 12.

The control part 500 has a supplying system drive part 517 for driving the powder supplying device 554 which supplies the powder 20 to the supplying tank 21 and a cleaning drive part 518 for driving the cleaning device 555 which performs cleaning (maintenance, maintenance and recovery) of the ejecting head unit 51.

Detected signals from a temperature and humidity sensor 560 which detects temperature and humidity as environmental conditions, and detected signals of other sensors, etc., are input to the I/O 507 of the control part 500.

An operation panel 522 for inputting and displaying information needed for the apparatus is connected to the control part 500.

When data indicating a part where the density of the three-dimensional object should be coarse is included in the forming data received from the forming data creating apparatus 600, the main control part 500A ejects an amount of droplets which amount is not enough for the permeation depth of the forming liquid 10 with respect to the powder layer 31 to reach the thickness of the powder layer 31 and forms a between-layers vacant space between the two forming layers 30 sequentially laminated in the laminating direction.

It should be noted that an imaging apparatus is configured with the forming data creating apparatus 600 and a three-dimensional printing apparatus (powder lamination-based imaging apparatus) 601.

Next, a forming process flow will be described referring to FIGS. 6A-6E. FIGS. 6A-6E are schematic cross-sectional views of the forming part illustrating the forming process flow.

A first forming layer 30 is formed on the forming stage 24 of the forming tank 22.

Figure 6A:
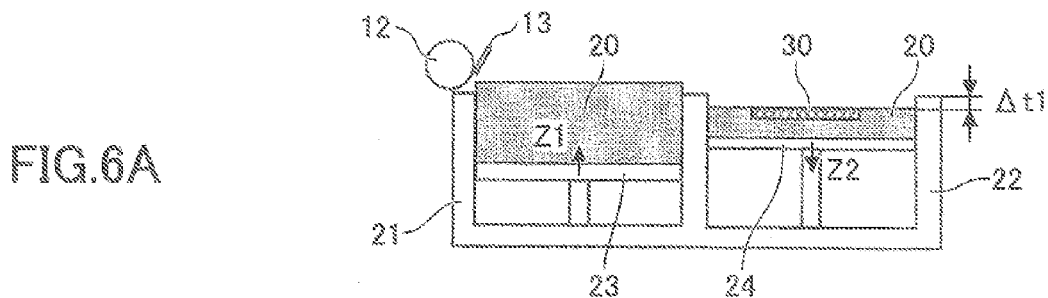
FIGS. 6A-6E are schematic cross-sectional views of the forming part illustrating a forming process flow.

When forming the next forming layer 30 on top of the forming layer 30, as shown in FIG. 6A, the supplying stage 23 of the supplying tank 21 is moved up in an arrow Z1 direction and the forming stage 24 of the forming tank 22 is moved down in an arrow Z2 direction.

At this time, descent distance of the forming stage 24 is set such that a gap between the powder layer surface of the forming tank 22 and the lower part (lower tangent part) of the flattening roller 12 becomes $\Delta t1$. The gap $\Delta t1$ corresponds to a thickness of the powder layer 31 which will be formed next. It is preferable that the gap $\Delta t1$ is somewhere between several 10 s μm and 100 μm.

Figure 6B:
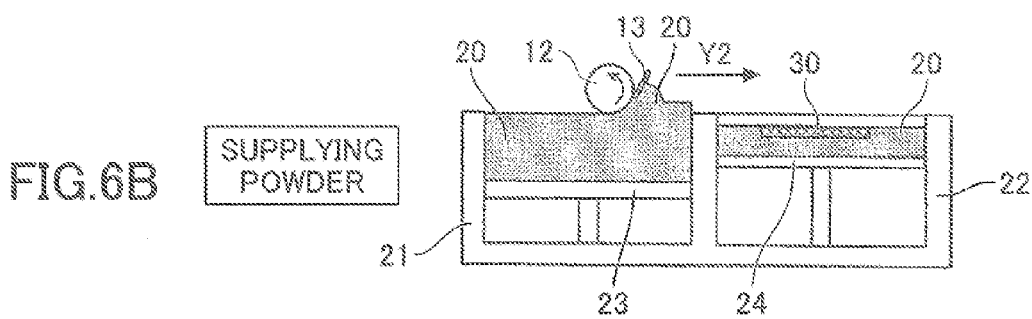

Next, as shown in FIG. 6B, the powder 20 which is located above an upper surface level of the supplying tank 21 is moved and supplied to the forming tank 22 by moving the flattening roller 12 in a Y2 direction (towards the forming tank 22) while rotating the flattening roller 12 in a forward direction (an arrow direction)(supplying powder).

Figure 6C:
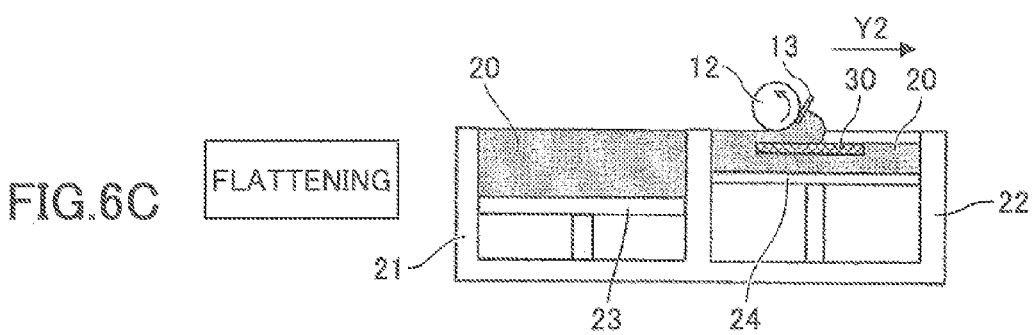
Figure 6D:
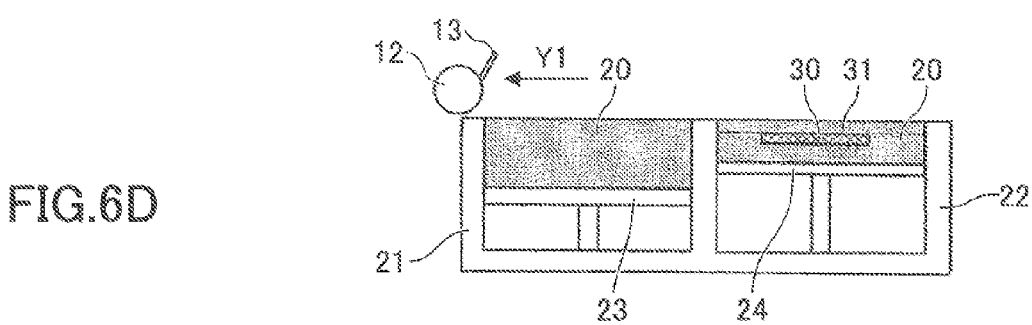

Furthermore, as shown in FIG. 6C, the flattening roller 12 is moved parallel to the stage surface of the forming stage 24 of the forming tank 22 and, as shown in FIG. 6D, the powder layer 31 with a thickness of $\Delta t1$ is formed on the forming layer 30 of the forming stage 24 (flattening). After forming the powder layer 31, the flattening roller 12 is moved in the arrow Y1 direction and is returned to the original position.

Here, the flattening roller 12 is configured to move keeping constant its distance to the upper surface level of the forming tank 22 and the supplying tank 21; thereby the powder 20 is moved onto the forming tank 22 by the flattening roller 12 and the powder layer 31 with a uniform thickness of Δt1 can be formed on the forming tank 22 or on the previously formed forming layer 30.

Figure 6E:
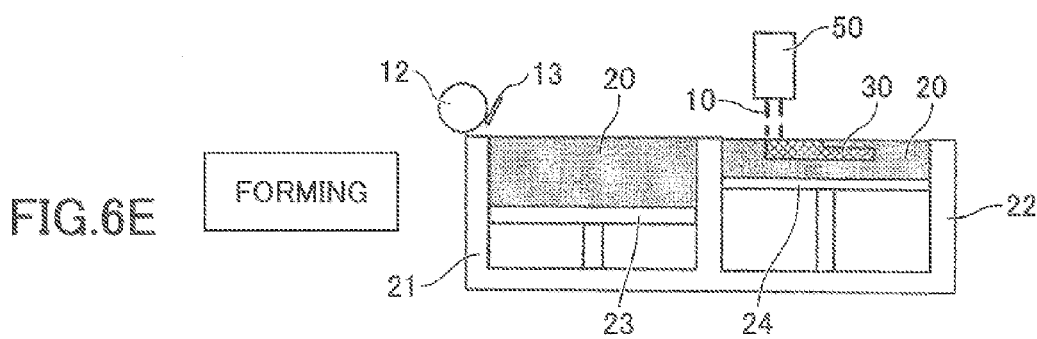

Then, as shown in FIG. 6E, the forming liquid 10 is ejected from the head 50 of the ejecting head unit 51 and a new forming layer 30 is formed on top of the previously formed forming layer 30 (forming).

It should be noted that the forming layer 30 is formed by, for example, having the forming liquid 10 ejected from the head 50 mixed with the powder 20, by having an adherent included in the powder 20 dissolved, and by having the powder particles bonded to each other by the dissolved adherent.

Then, a new forming layer is formed by repeating the above-described supplying powder and flattening processes and the forming liquid ejecting process by the head. Here, the new forming layer and the forming layer thereunder are integrated to form a part of a three-dimensional object.

Thereafter, by repeating the supplying powder and flattening processes and the forming liquid ejecting process by the head as many times as necessary, the three-dimensional object is completed.

Next, an example of a powder material for three-dimensional printing (powder) and the forming liquid used in the above three-dimensional printing apparatus will be described. It should be noted that the powder material and the forming liquid are not limited to the powder and the forming liquid described below.

The powder material for three-dimensional printing includes a base material and a water-soluble organic material which covers the base material with an average thickness from 5 nm to 500 nm, is dissolved by an action of a bridging agent containing water as a forming liquid, and has a bridging capability.

In the powder material for three-dimensional printing, because the water-soluble organic material is dissolved by the action of the bridging agent containing water and has a bridging capability, when the bridging agent containing water is applied to the water-soluble organic material, the water-soluble organic material is dissolved and performs bridging as a result of the action of the bridging agent included in the bridging agent containing water.

Using the above mechanism, by forming a thin layer (powder layer) using the above powder material for three-dimensional printing, and by ejecting the bridging agent containing water as a forming liquid 10 onto the powder layer, in the powder layer, as a result of bridging of the dissolved water-soluble organic material, particles of the powder layer are bonded and cured, thereby forming a forming layer 30.

At this time, as the covering amount of the water-soluble organic material which covers the base material is from 5 nm to 500 nm in the average thickness, dissolved water-soluble organic material exists only in a required minimum amount surrounding the base material and the dissolved water-soluble organic material performs bridging to form a three-dimensional network. As a result, the curing of the powder layer is performed with good dimensional precision and good strength.

By performing the above operation repeatedly, a complicated three-dimensional object can be formed easily and efficiently with a good dimensional precision without having a shape collapse before sintering.

Since the three-dimensional object obtained by the above operation has a good hardness, the shape collapse does not occur even when remaining powder material for three-dimensional printing is removed by an air blow process, and the sintering thereafter can be performed easily.

Also, in the three-dimensional object formed by the above operation, because the base material exists densely (with a high filling rate) and only a very small amount of the water-soluble organic material exists surrounding the base material, when a compact (three-dimensional object) is obtained by sintering thereafter, no unnecessary vacant space exists in the compact, thus a compact (three-dimensional object) with a beautiful exterior can be obtained.

—Base Material—

As a base material, there is no specific limit as long as it has a form of powder or particles, and any base material can be selected appropriately according to the purpose. As a material of the base material, for example, a metal, a ceramic, a carbon, a polymer, a wood, and a biocompatible material can be listed. But from the view point of obtaining a high strength three-dimensional object, it is preferable to use a metal or a ceramic to which a sintering process can be applied at the end.

As a metal, for example, a stainless (SUS) steel, iron, copper, titanium, or silver can be preferably listed. As a stainless (SUS) steel, for example, SUS316L can be listed.

As a ceramic, for example, a metal oxide can be listed. Specifically, silica ($SiO_2$), alumina ($Al_2O_3$), zirconia ($ZrO_2$), and titania ($TiO_2$) can be listed.

As a carbon, for example, graphite, graphene, carbon nanotube, carbon nanohorn, and fullerene can be listed.

As a polymer, for example, a known resin which is insoluble to water can be listed.

As a wood, for example, wood chips and cellulose can be listed.

As a biocompatible material, for example, polylactic acid and calcium phosphate can be listed.

Any of these materials can be used singly, or two or more of these materials can be used together.

It should be noted that in the present invention, as a base material, a commercially available product of particles or powder formed by these materials can be used. As a commercially available product, for example, SUS316L (by Sanyo Special Steel, PSS316L), $SiO_2$ (by Tokuyama, Ekuserika SE-15), $AlO_2$ (by Taimei Chemicals, Taimicron TM-5D), and $ZrO_2$ (by Tosoh, TZ-B53) can be listed.

Also, as a base material, in order to increase the affinity with a water-soluble organic material, a known surface (reforming) treatment may be performed.

—Water-Soluble Organic Material—

As a water-soluble organic material, there is no limit as long as it is dissolved in water and it has a bridging capability by an action of a bridging agent. In another words, as long as it is water-soluble and capable of performing the bridging by using a bridging agent, any water-soluble organic material can be appropriately selected according to the purpose.

Here, the water-soluble of the water-soluble organic material means that, for example, when 1 g of the water-soluble organic material is mixed with 100 g of water at 30° C., 90 mass % or more is dissolved.

Also, as a water-soluble organic material, it is preferable that the viscosity of 4 mass % (w/w %) aqueous solution at 20° C. is equal to or less than 40 mPa·s. It is more preferable that the viscosity is from 1 to 35 mPa·s. It is especially preferable that the viscosity is from 5 to 30 mPa·s.

If viscosity of the water-soluble organic material exceeds 40 mPa·s, then there is a case where the strength of the cured object (three-dimensional object, cured object for sintering) which is formed by applying a bridging agent containing water to the powder material for three-dimensional printing (powder layer) is not strong enough so that the shape collapse may occur during a process of sintering or handling by hand thereafter. Also, there is a case where the dimensional precision of the cured object (three-dimensional object, cured object for sintering) which is formed by applying a bridging agent containing water to the powder material for three-dimensional printing (powder layer) is not precise enough.

The viscosity of the water-soluble organic material can be measured, for example, according to JISK7111.

—Bridging Agent Containing Water—

As a bridging agent containing water which is used as a forming liquid, there is no specific limit as long as a bridging agent is included in an aqueous medium. Any bridging agent containing water can be appropriately selected according to the purpose. It should be noted that the bridging agent containing water may include another component selected appropriately as necessary other than the aqueous medium and the bridging agent.

As the other component, it can be appropriately selected taking into account various conditions such as a type of means for applying the bridging agent containing water, a frequency of use, and an amount to use. For example, in the case where the bridging agent containing water is applied by using a liquid ejection method, it can be selected taking into account an influence of clogging a nozzle of a liquid ejection head, etc.

As an aqueous medium, for example, water, an alcohol such as ethanol, an ether, and a ketone can be listed. It is preferable to use water. It should be noted that the aqueous medium may include a small amount of another component other than water, such as alcohol.

Due to using the above powder material for three-dimensional objects and the bridging agent containing water as a forming liquid, compared to a combination in which a binder for binding the powder (base material) is ejected from the liquid ejection head, there is less clogging of nozzles and the durability of the head is increased.

Next, a three-dimensional object production method according to the first embodiment of the present invention will be described.

First, a powder layer formed in the present embodiment and a powder used in the present embodiment will be described referring to FIGS. 7-10.

In the present embodiment, as a powder 20, a powder (fine powder) including SUS316 is used. Specifically, the above-described PSS316L of Sanyo Special Steel Co., Ltd., (−20 μm) (hereinafter, refer to as "use powder") is used.

Figure 8:
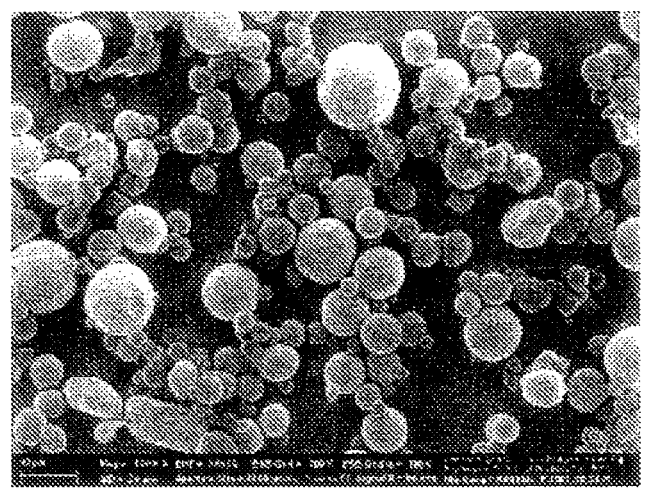
FIG. 8 is a SEM picture of the powder used in the embodiment.
Figure 9:
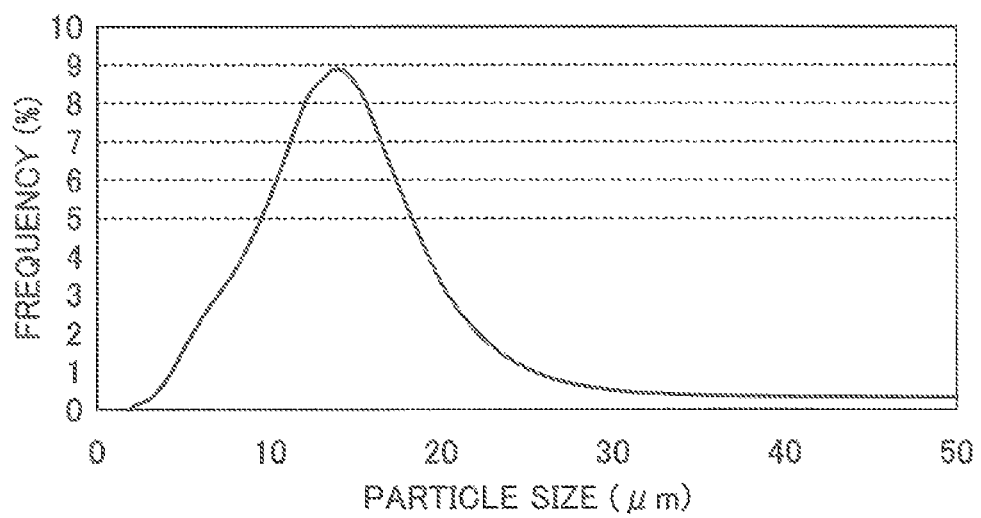
FIG. 9 is an illustration of a particle size distribution of volume average particle diameter of the powder used in the embodiment.
Figure 10:
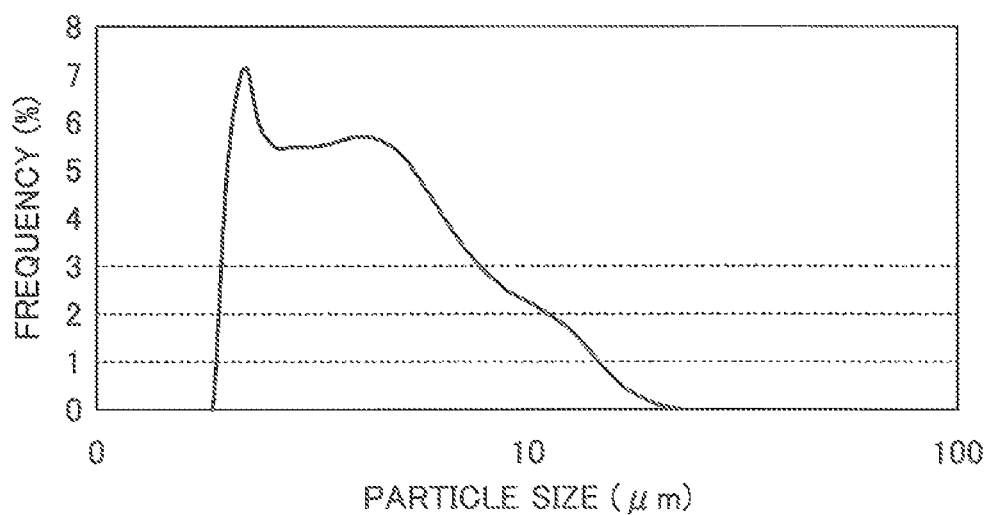
FIG. 10 is an illustration of a particle size distribution of number average particle diameter of the powder used in the embodiment.

Also, a SEM picture of the use powder is shown in FIG. 8, a particle size distribution of volume average particle diameter is shown in FIG. 9, and a particle size distribution of number average particle diameter is shown in FIG. 10.

The particle size distribution of the volume average particle diameter has been measured by using a dry-type particle diameter distribution measurement apparatus (for example, microtrac series of Nikkiso Co., Ltd.). A volume average particle diameter of the use powder is about 14 μm. As shown in FIG. 10, there is a feature that the number of particles whose diameter is relatively small (not greater than 10 μm, or not greater than 7 μm) is large.

Figure 7:
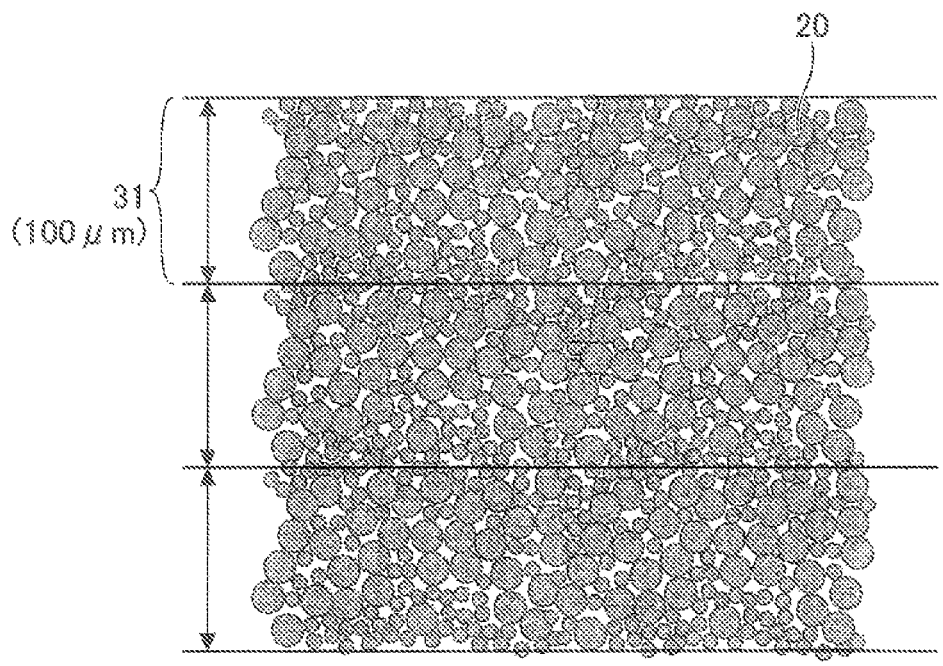
FIG. 7 is a cross-sectional view of powder of a powder layer illustrating a first embodiment of the present invention.

This use powder is supplied to the supplying tank 21 of the three-dimensional printing apparatus, conveyed and supplied to the forming layer 22, and the powder layer 31 whose individual layer thickness is 100 μm is formed. FIG. 7 shows a schematic diagram of a cross section of 3-layers worth of the powder 20 of the powder layer 31 when the powder layer 31 is formed.

Next, a case of forming a forming layer while forming a between-layers vacant space between the forming layers (an area where a powder density is relatively low) will be described referring to FIGS. 11-14. It should be noted that FIGS. 11-14 are schematic illustrations provided for the description.

Figure 11:
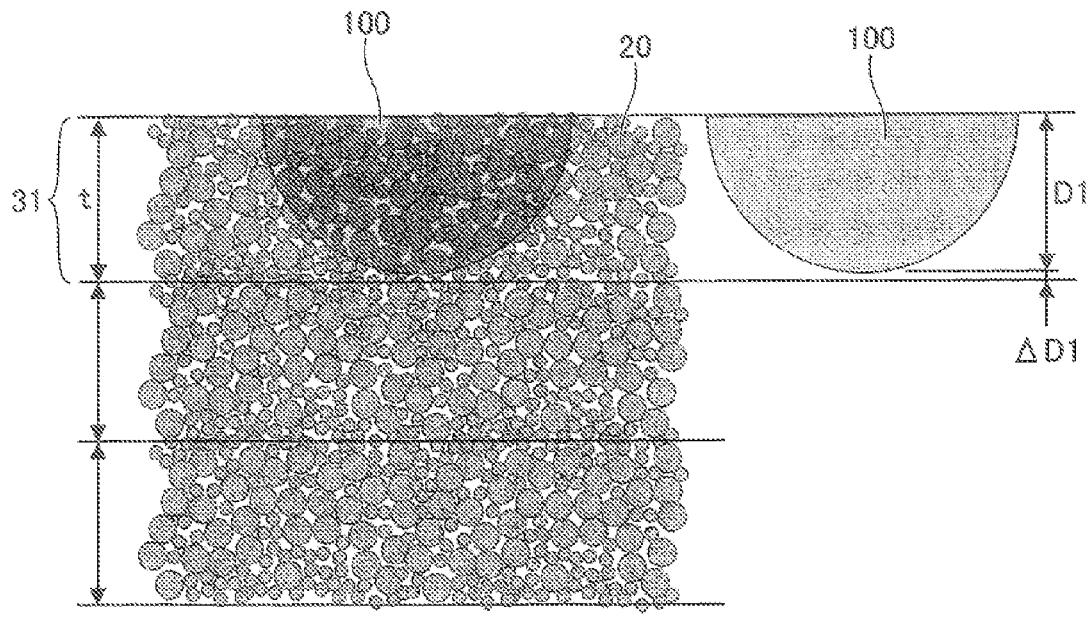
FIG. 11 is a schematic illustration provided for describing the forming of a forming layer by forming a between-layers vacant space between the forming layers.

First, as shown in FIG. 11, when a liquid droplet 100 of the forming liquid 10 is ejected onto the powder layer 31, the liquid droplet 100 is ejected whose liquid amount is such that a permeation depth D1 of the forming liquid 10 with respect to the powder layer 31 does not reach the thickness t of the powder layer 31 (D1<t). In other words, the droplet amount of the liquid droplets 100 is such that the liquid droplets 100 permeate from the front surface of the powder layer 31 to the depth D1, and stop at a position which does not reach the bottom surface of the powder layer 31 by ΔD1.

It should be noted that FIG. 11 shows an example in which two-dimensional image data is generated with a pitch of 300 by 300 dpi (corresponding to about 85 μm), and, based on the data, the liquid droplets 100 are dropped (ejected), and the dropped liquid droplets 100 land on the surface of the powder layer 31.

Here, the droplet amount described above can be obtained experimentally. In other words, for example, the powder is spread on a glass substrate with a thickness of 100 μm and a liquid droplet is dropped and the dropped liquid droplet lands on the powder. At this time, by observing with a camera from a surface which is opposite to the surface where the liquid droplet has landed, it can be determined whether the liquid droplet has permeated through the thickness of 100 μm. There, by repeating this experiment varying the amount of the droplet, the droplet amount which does not permeate through the thickness of 100 μm can be obtained. From the experiment, the amount is, but not limited to, about 200 pl/drop.

Figure 12:
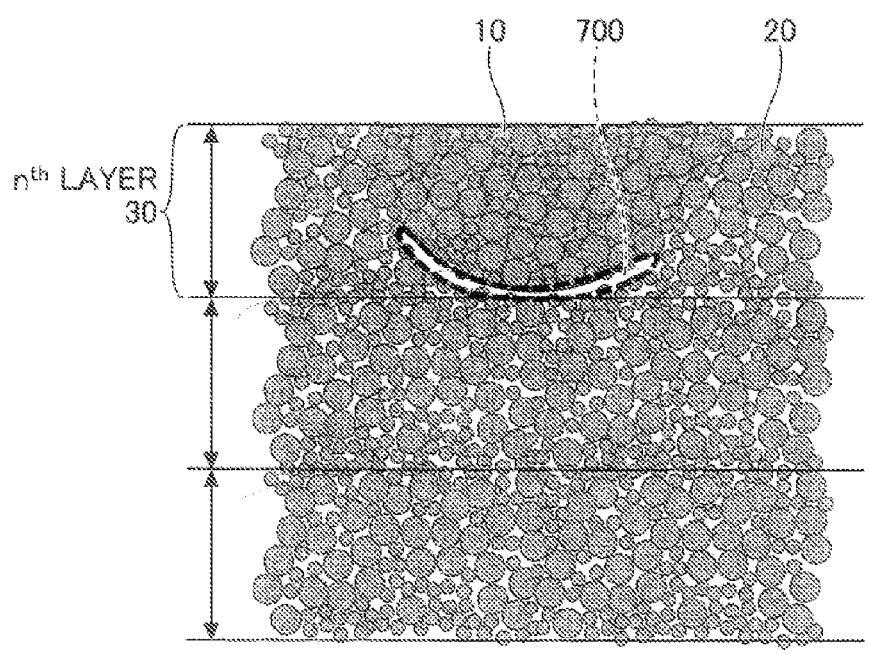
FIG. 12 is a schematic illustration following FIG. 11.
Figure 13:
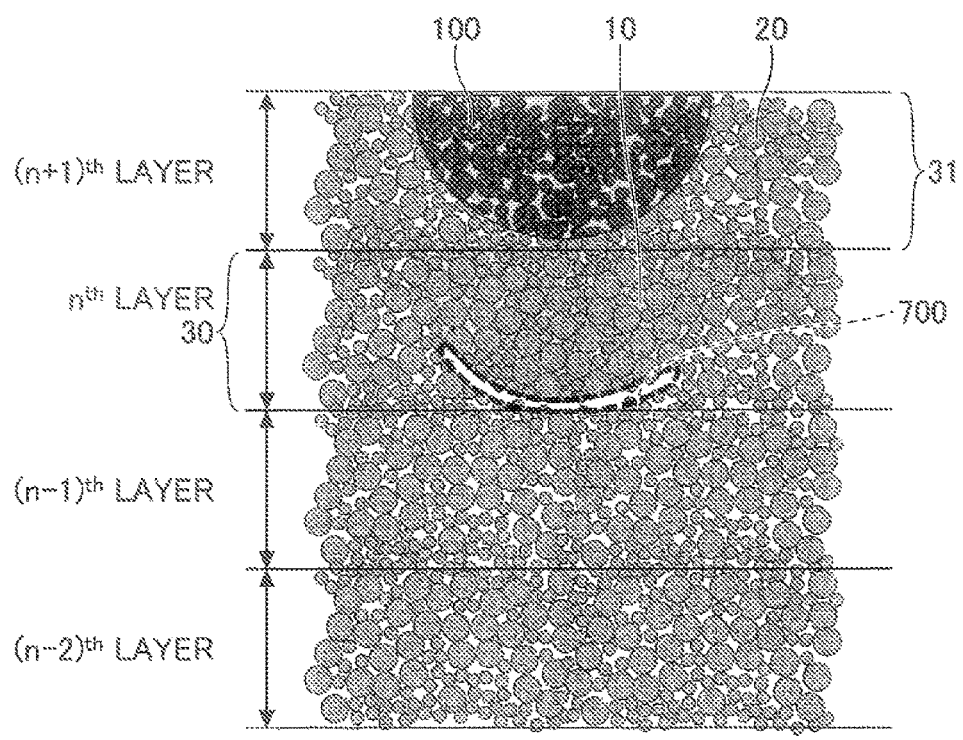
FIG. 13 is a schematic illustration following FIG. 12.
Figure 14:
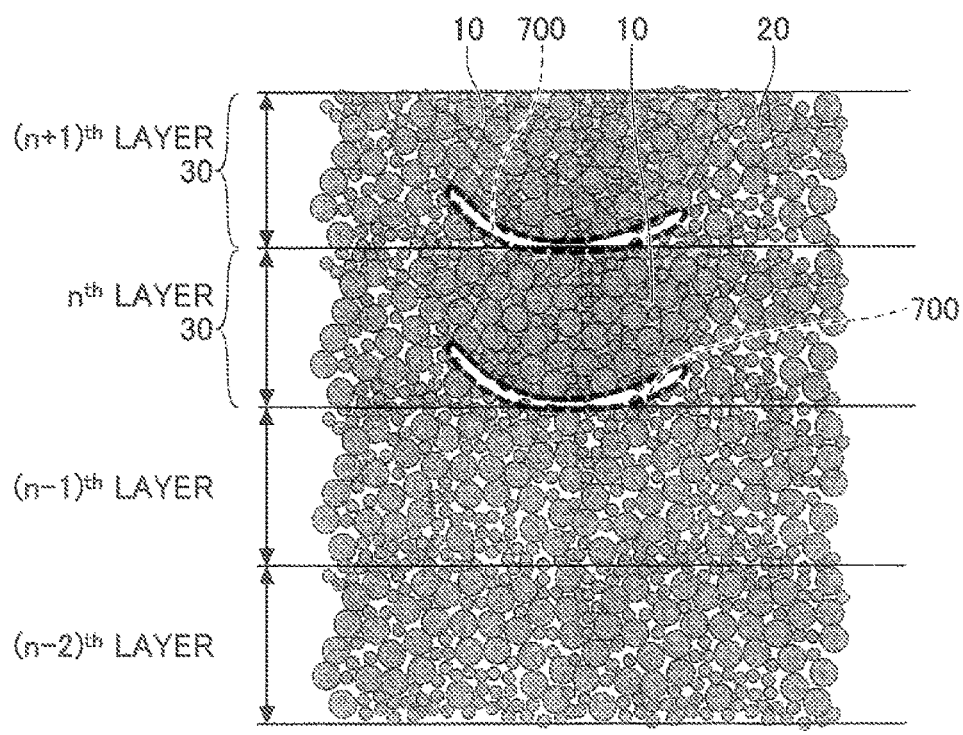
FIG. 14 is a schematic illustration following FIG. 13.

As described above, when a liquid amount of the droplet, which amount is not enough for the forming liquid to permeate through the thickness of a layer, is dropped, as schematically shown in FIGS. 12-14, a rearrangement of the powder (fine powder) occurs due to a liquid bridging force.

In other words, as shown in FIG. 12, when the liquid droplets 100 are dropped into the powder 20 of the powder layer 31, due to the bridging force by the forming liquid 10, the rearrangement of the powder 20 occurs in which particles of the powder (fine powder) 20 get closer to each other.

As a result, powder density of an area where the forming liquid 10 permeates becomes higher while the powder density of an area where the forming liquid 10 does not permeate becomes relatively lower, and a between-layers vacant space 700 appears in an area indicated by a dashed line in FIG. 12. It should be noted that the between-layers vacant space is a vacant space at least a part of which is formed between one forming layer and another forming layer. It is not limited to a vacant space all of which is formed between one forming layer and another forming layer.

Assuming that the current powder layer 31 is the $n^{th}$ layer, as shown in FIG. 13, $(n+1)^{th}$ layer of the powder layer 31 is formed on the $n^{th}$ layer of the powder layer 31, and similar as the previous process, an amount of the liquid droplets 100 is ejected which amount is not enough for the permeation depth D1 of the liquid to reach the thickness t of one layer of the powder layer 31. As a result, as shown in FIG. 14, another between-layers vacant space 700 appears between the (n+1)$^{th}$ layer and the n$^{th}$ layer.

As described above, when there is an area in the three-dimensional object whose density should be lower, the forming layer is formed by ejecting an amount of liquid droplets which amount is not enough for the permeation depth of the liquid to reach the thickness of one layer of the powder layer.

As a result, because a between-layers vacant space 700 is formed between the two successive forming layers 30 in the laminating direction, a low density area can be easily and selectively arranged in the three-dimensional object.

Next, a case of forming a forming layer without forming a between-layers vacant space between the forming layers (an area where a powder density is relatively low) will be described referring to FIGS. 15-18. It should be noted that FIGS. 15-18 are schematic illustrations provided for the description.

Figure 15:
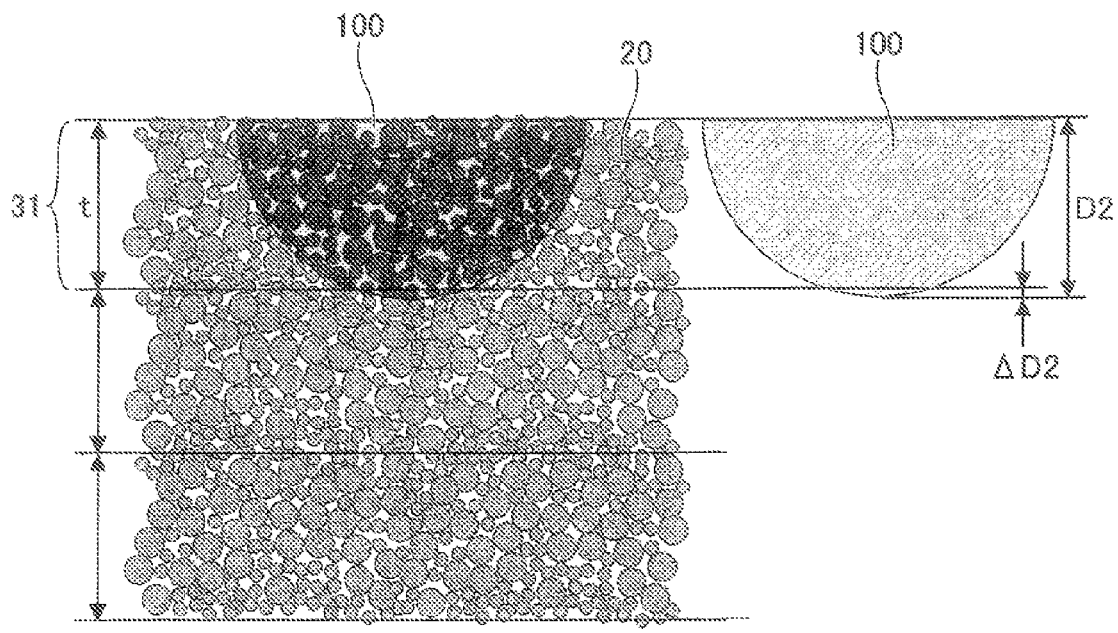
FIG. 15 is a schematic illustration provided for describing the forming of a forming layer without forming a between-layers vacant space between the forming layers.

First, as shown in FIG. 15, when liquid droplets 100 of the forming liquid 10 are ejected onto the powder layer 31, the liquid droplets 100 are ejected whose liquid amount is such that a permeation depth D2 of the forming liquid 10 with respect to the powder layer 31 exceeds the thickness t of the powder layer 31 (D2>t). In other words, the amount of the liquid droplets 100 is such that the liquid droplets 100 permeate from the front surface of the powder layer 31 to the depth D2, and permeate up to a position which has passed the bottom surface of the powder layer 31 by ΔD2.

It should be noted that FIG. 15 shows an example in which two-dimensional image data is generated with a pitch of 300 by 300 dpi (corresponding to about 85 µm), and, based on the data, the liquid droplets 100 are dropped (ejected), and the dropped liquid droplets 100 land on the surface of the powder layer 31.

It should be noted that how to obtain such an amount of liquid droplets is the same as described before, and the liquid amount is, for example, about 240 pl/drop.

Figure 16:
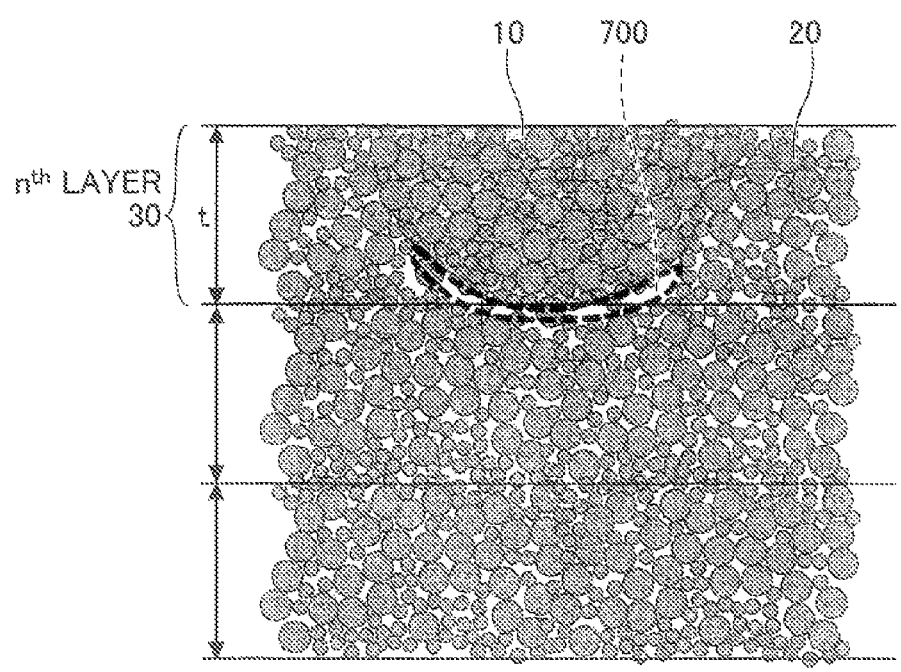
FIG. 16 is a schematic illustration following FIG. 15.

Also in this case, when there is no forming layer 30 below, as shown in FIG. 16, as a result of dropping the liquid droplet 100 into the powder 20, due to the bridging force by the forming liquid 10, the rearrangement of the powder 20 occurs in which particles of the powder (fine powder) get closer to each other.

As a result, powder density of an area where the forming liquid 10 permeates becomes higher while powder density of an area where the forming liquid 10 does not permeate becomes relatively lower, and a between-layers vacant space 700 appears in an area indicated by a dashed line in FIG. 16.

Figure 17:
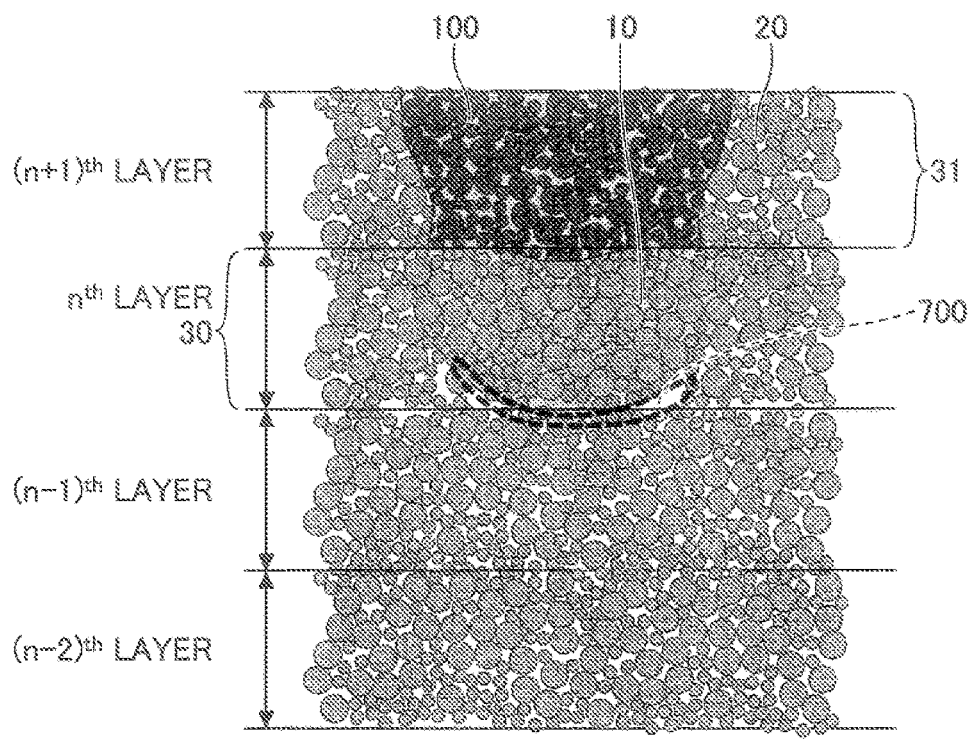
FIG. 17 is a schematic illustration following FIG. 16.

However, on the powder layer 31 of the n$^{th}$ layer of FIG. 16, as shown in FIG. 17, the powder layer 31 of the (n+1)$^{th}$ layer is formed, and an amount of the liquid droplets 100 is ejected which amount is enough for the permeation depth D2 of the liquid to exceeds even slightly the thickness t of one layer of the powder layer 31. With the above operation, the forming liquid 10 of the n$^{th}$ layer and the forming liquid 10 of the (n+1)$^{th}$ layer are integrated because of the good affinity of the forming liquid 10 of the n$^{th}$ layer and the forming liquid 10 of the (n+1)$^{th}$ layer, and a large forming liquid existing area is formed.

Figure 18:
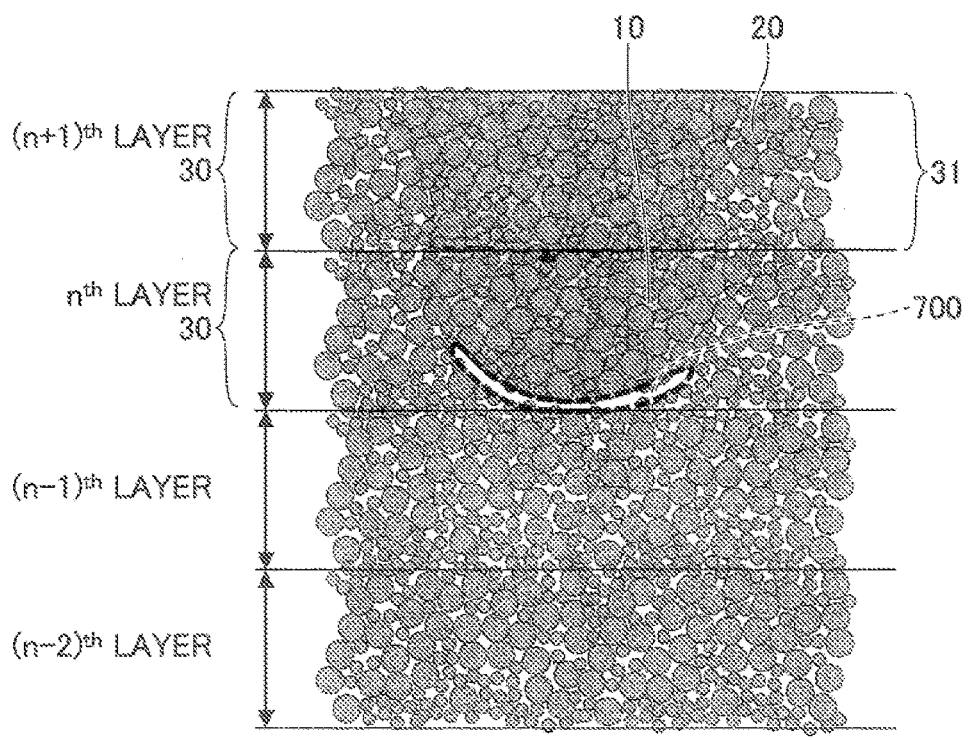
FIG. 18 is a schematic illustration following FIG. 17.

As a result, as shown in FIG. 18, no between-layers vacant space is formed between the forming layer 30 of the n$^{th}$ layer and the forming layer 30 of the (n+1)$^{th}$ layer.

Here, regarding the liquid bridging force which acts on two spherical particles of the same diameter will be described referring to FIG. 19.

The liquid bridging force F is, for example, according to the "Surface Chemistry of Powder Particles and Adhesion Phenomenon" (CHIKAZAWA Masatoshi and TAKEI Takashi, Journal of Japan Seawater Society, vol. 41, No. 4 (1987)), represented by the following formula (1).

$$F = 2\pi R o \sigma (1 + \tan \alpha/2) \tag{1}$$

Figure 19:
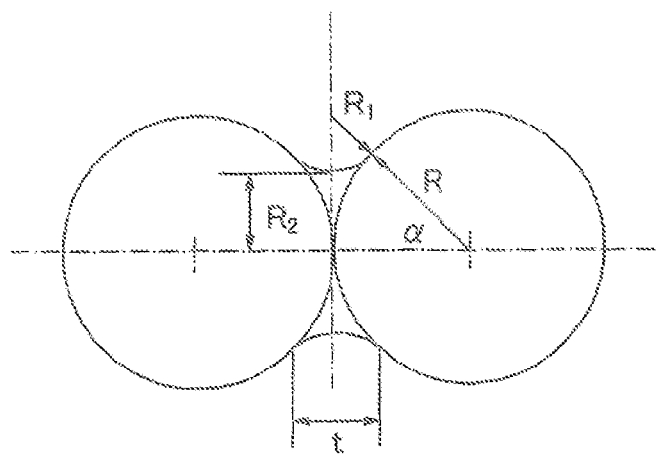
FIG. 19 is an illustration for a liquid bridge force.

Here, Ro is a powder particle diameter (particle diameter), σ is a surface tension of the liquid, and α is an angle shown in FIG. 19.

On the other hand, because a particle's weight is proportional to the cube of a radius of the particle (particle radius), it can be said that, regarding a particle's movement by the liquid bridging force, the smaller the particle radius, the particle moves the more easily. Also, the greater the amount of the same liquid, a becomes the greater and the liquid bridging force becomes the smaller.

Figure 20:
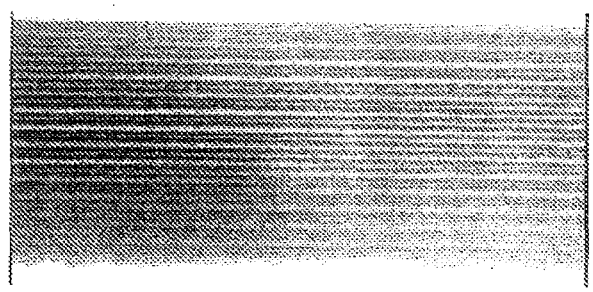
FIG. 20 is a SEM picture of a three-dimensional object in which a between-layers vacant space is formed.
Figure 21:
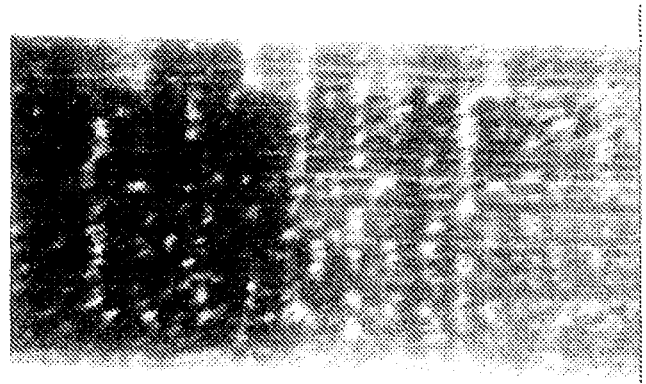
FIG. 21 is a SEM picture of a three-dimensional object in which a between-layers vacant space is not formed.

Here, FIG. 20 shows a SEM picture of a three-dimensional object in which a between-layers vacant space is formed. FIG. 21 shows a SEM picture of a three-dimensional object in which a between-layers vacant space is not actively formed.

It should be noted that both of the volume average particle diameters of the particles of FIG. 20 and FIG. 21 are about 14 µm. It is easy to recognize spaces between layers in FIG. 20 while it is not easy to recognize spaces between layers in FIG. 21. It should be noted that the internal structure together with its density distribution is maintained even after the sintering.

As described above, weight saving of a three-dimensional object can be achieved by forming a vacant space between layers by controlling the liquid amount. In other words, by creating a vacant space where structural strength is not required, and by not creating a vacant space where structural strength is required, weight saving of the three-dimensional object can be achieved while securing a required strength of the entire three-dimensional object.

Also, it is possible to make the weight balance of the three-dimensional object closer to the weight balance of the end product. In other words, especially in the case of prototyping before producing an end product (rapid prototyping), it may be required to check manual handling properties and the weight balance of the three-dimensional object, and in such a case, it is preferable that the weight balance of the three-dimensional object is closer to the weight balance of the end product.

It should be noted that there is a problem that the forming data (three-dimensional data such as an STL format) itself must be changed beforehand accordingly in the case where the density is changed by, as in the prior art, partially forming a honeycomb structure, a sponge structure, and a corrugated structure.

According to the present invention, it is not necessary to change the forming data itself. The change of density can be achieved only by changing the amount of the liquid droplets. Furthermore, the density can be changed even within the same layer.

Next, a production method of a three-dimensional object according to the second embodiment of the present invention will be described.

Figure 22:
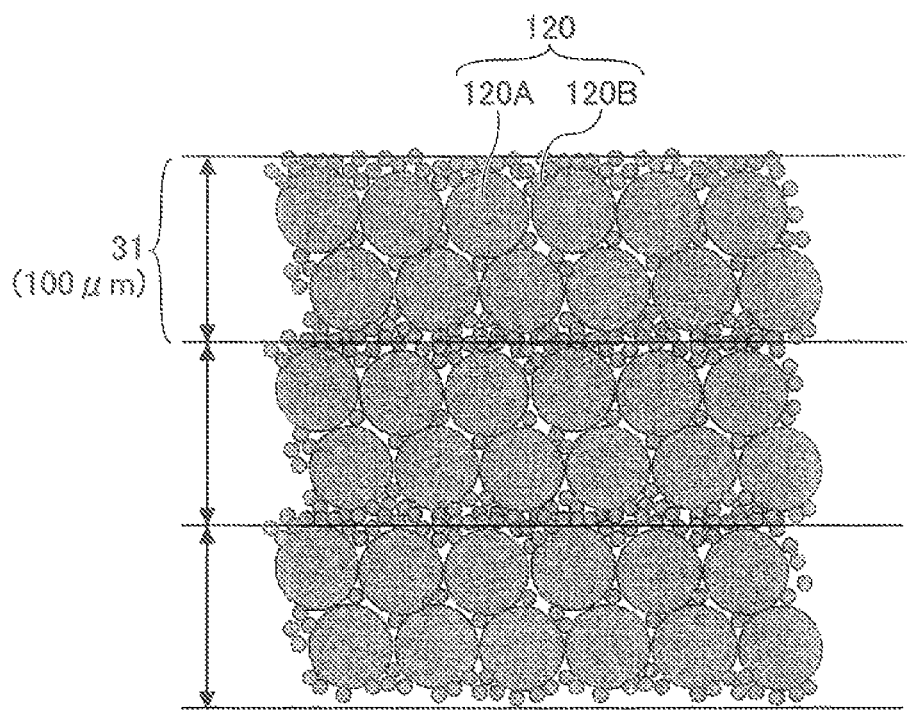
FIG. 22 is a cross-sectional view of powder of a powder layer illustrating a second embodiment of the present invention.

In the present embodiment, as shown in FIG. 22, a mixed powder 120 in which a powder 120B with a small particle diameter and a powder 120A with a large particle diameter larger than the powder 120B are mixed is used, that is, a powder in which at least two kinds of powders with different center particle diameters are mixed, is used. For example, PSS316L (–10 µm) and PSS316L (20-53 µm) of the above Sanyo Special Steel Co., Ltd., are mixed and used.

Figure 23:
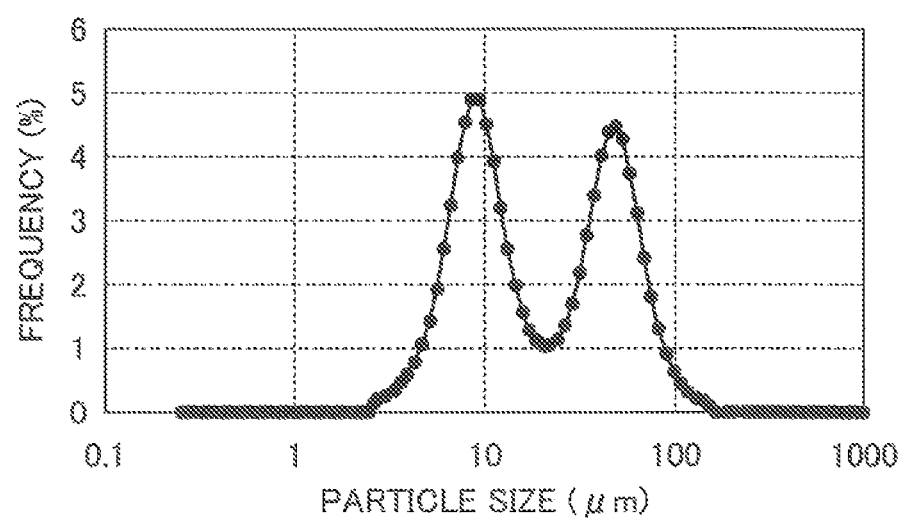
FIG. 23 is an illustration of a particle size distribution of the powder used in the embodiment.

FIG. 22 is a schematic illustration of a state of a powder when a powder layer 31 whose one layer thickness is 100 μm is formed by the mixed powder 120. Also, as shown in FIG. 23 of the particle size distribution of the volume average particle diameter of the mixed powder 120, there exist two kinds of center particle diameters of the volume average particle diameter.

First, in the present embodiment, similar to the first embodiment, when liquid droplets 100 of the forming liquid 10 are ejected onto the powder layer 31, the liquid droplets 100 are ejected whose liquid amount is such that a permeation depth D1 of the forming liquid 10 with respect to the powder layer 31 does not reach the thickness t of the powder layer 31 (D1<t). In other words, the amount of the liquid droplets 100 is such that the liquid droplets 100 permeate from the front surface of the powder layer 31 to the depth D1, and stop at a position which does not reach the bottom surface of the powder layer 31 by ΔD1.

Figure 24:
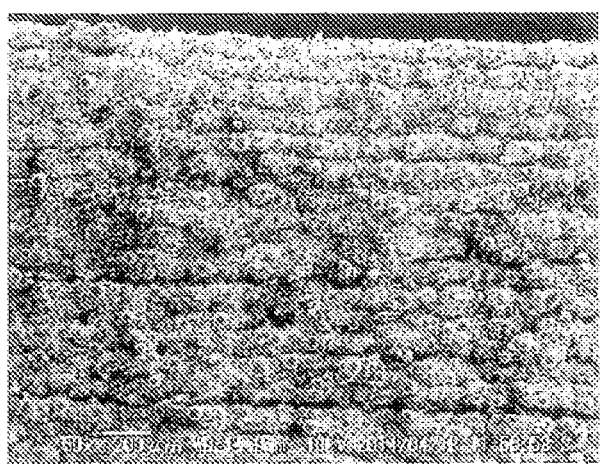
FIG. 24 is a SEM picture of a three-dimensional object according to the embodiment.
Figure 25:
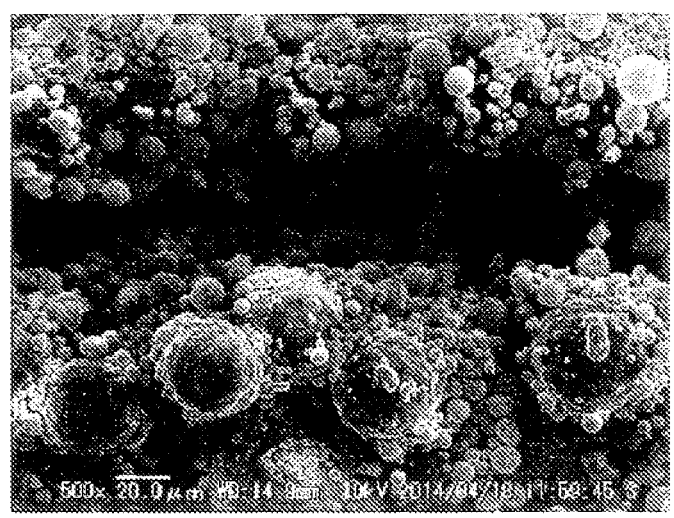
FIG. 25 is a SEM picture in which an interlayer in FIG. 24 is enlarged.

With the above operation, a between-layers vacant space can be formed. FIG. 24 shows a SEM picture of a three-dimensional object of this case. FIG. 25 is a SEM picture in which an interlayer in FIG. 24 is enlarged.

As described above, by using a mixed powder including different particle diameters, referring to the formula (1) for obtaining the above-described liquid bridging force F, a particle with a small diameter experiences more significant movement caused by a liquid bridging force compared to a particle with a larger diameter, thus it becomes easier to form a vacant space between laminating layers.

Figure 26:
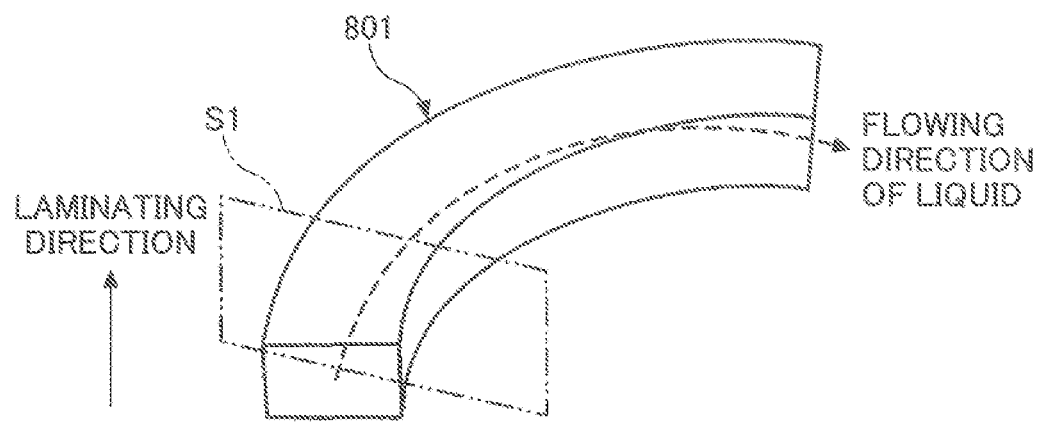
FIG. 26 is a perspective view of a filter as a three-dimensional object according to the present invention.
Figure 27:
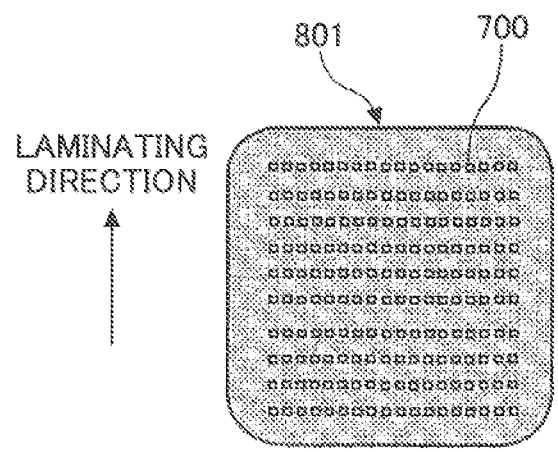
FIG. 27 is a cross-sectional view in a face S1 in FIG. 26.

Next, an example of a three-dimensional printing apparatus according to the present invention will be described referring to FIG. 26 and FIG. 27. FIG. 26 is a perspective view of a filter member 801 as a three-dimensional object. FIG. 27 is a cross-sectional view in a face S1 in FIG. 26.

The filter member 801 is a sintered body which is obtained by sintering a three-dimensional object at an appropriate temperature in an appropriate atmosphere, which three-dimensional object has been produced by using a ceramic powder using a production method according to the present invention.

It is possible to image (produce) the filter member 801 with a predetermined orientation and a predetermined directivity by making the three-dimensional object have a between-layers vacant space 700 selectively in a predetermined area inside the three-dimensional object.

Here, by making the area in which the vacant space 700 is arranged be slightly inside of the outermost of the three-dimensional object, it becomes possible to limit an area in which fluid flows and to keep the fluid's outflow to the outside of the filter member 801 to a minimum.

Figure 28:
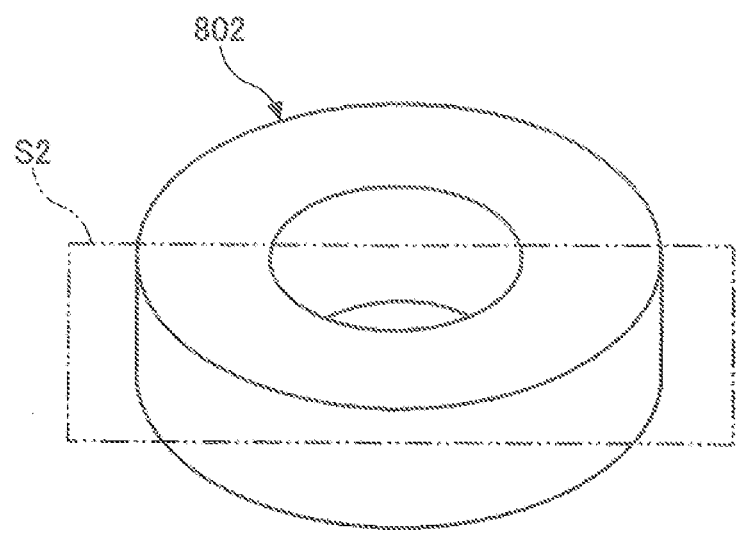
FIG. 28 is a perspective view of an oil permeated bearing as a three-dimensional object according to the present invention.
Figure 29:
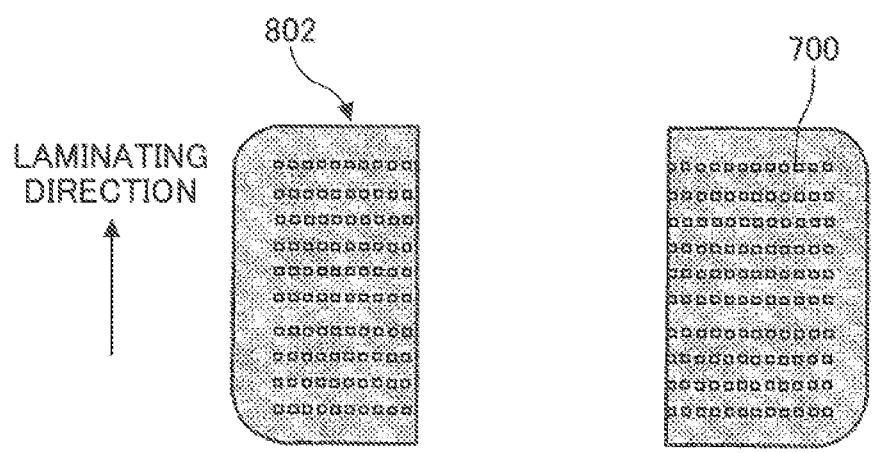
FIG. 29 is a cross-sectional view in a face S2 in FIG. 28.

Next, another example of a three-dimensional object according to the present invention will be described referring to FIG. 28 and FIG. 29. FIG. 28 is a perspective view of an oil permeated bearing 802 as a three-dimensional object according to the present invention. FIG. 29 is a cross-sectional view in a face S2 in FIG. 28.

The oil permeated bearing 802 is a sintered body whose vacant space is permeated by oil. The sintered body is obtained by sintering a three-dimensional object at an appropriate temperature in an appropriate atmosphere, which three-dimensional object has been produced by using a metal powder using a production method according to the present invention.

Here, also by making the area in which the vacant space 700 is arranged be slightly inside of the outermost of the three-dimensional object, it becomes possible to limit an outflow of the oil, and by making the oil be selectively unevenly distributed in a sliding surface, it becomes possible to obtain a bearing member with better sliding properties and better durability.

Figure 30:
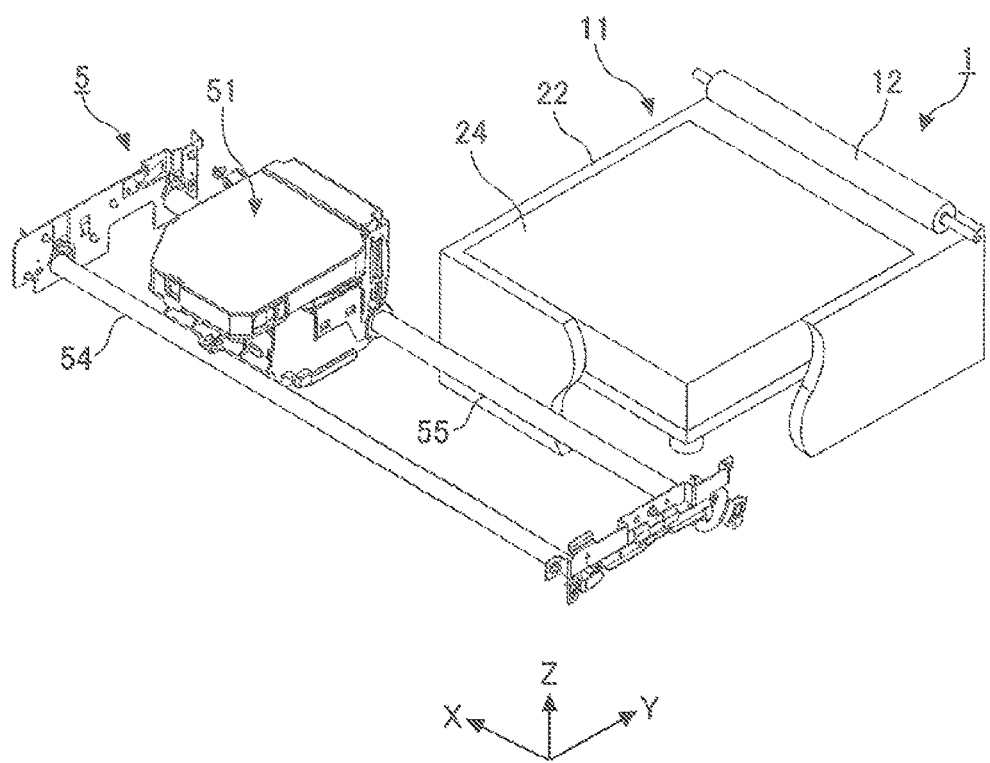
FIG. 30 is a main section perspective view of a second example of a three-dimensional printing apparatus.
Figure 31A:
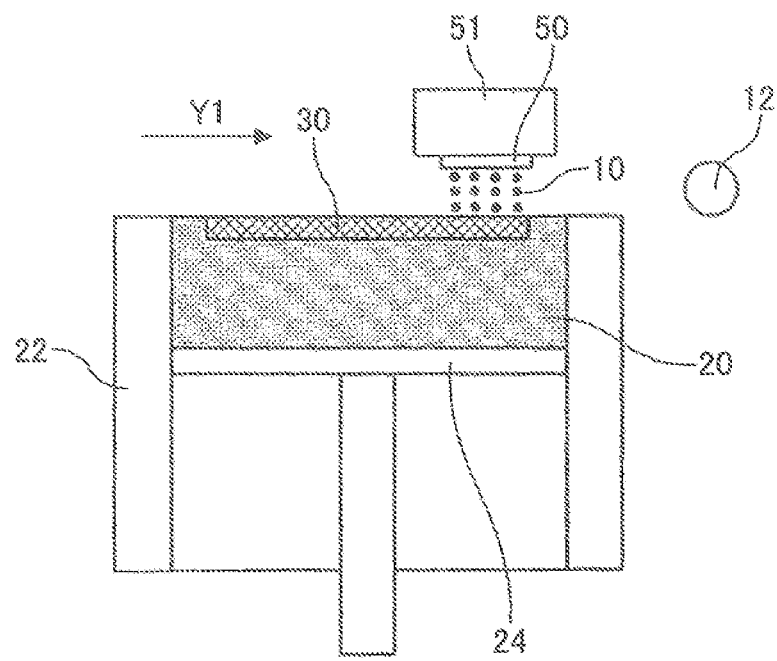
FIGS. 31A and 31B are cross-sectional views of a forming part illustrating a forming process flow of the second example.
Figure 31B:
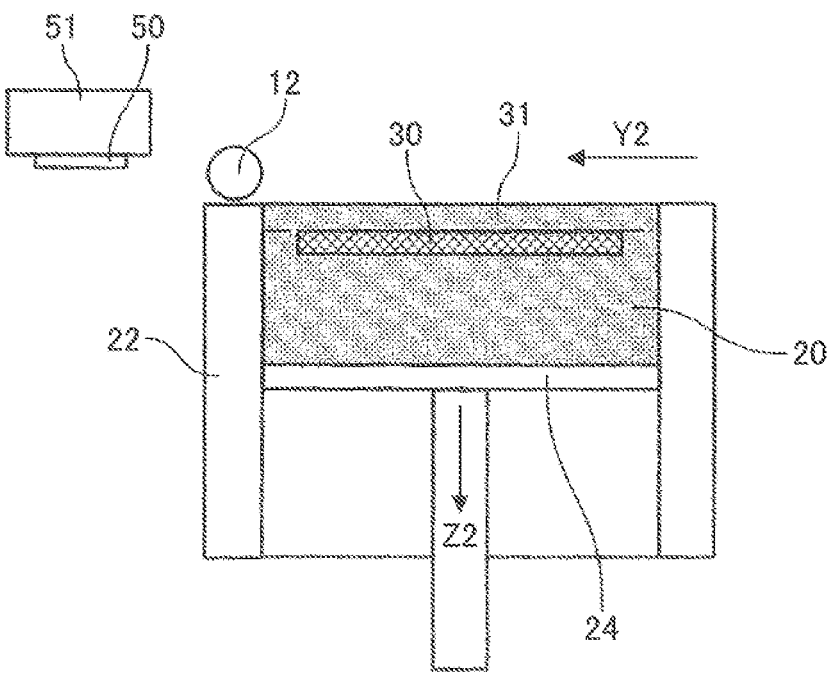

Next, a second example of a three-dimensional printing apparatus will be described referring to FIG. 30, FIG. 31A and FIG. 31B. FIG. 30 is a main section perspective view of the second example of a three-dimensional printing apparatus. FIGS. 31A and 31B are cross-sectional views of a forming part illustrating a forming process flow of the second example.

This three-dimensional printing apparatus is a powder lamination-based imaging apparatus which includes, similar to the three-dimensional printing apparatus of the first example, a forming part 1 in which a forming layer made of bonded powder is formed and a forming unit 5 as a forming means in which a three-dimensional object is produced by ejecting liquid droplets of the forming liquid onto the forming part 1.

The forming part 1 includes only a forming tank 22 as a powder tank 11 and the powder is supplied to the forming tank 22 from a powder supplying apparatus.

In the forming unit 5, the ejection head unit 51 is supported by the guiding members 54 and 55, and capable of reciprocating in an arrow X direction (refer to as "main-scanning direction").

It should be noted that other configurations are the same as the three-dimensional printing apparatus of the first example.

In this three-dimensional printing apparatus, as shown in FIG. 31A, the forming layer 30 is formed by ejecting a liquid droplet of the forming liquid 10 from the head 50 of the ejection head unit 51 onto the powder 20 which has been supplied onto the forming stage 24 of the forming tank 22.

At this time, one scan worth (one scan area worth) of forming process is performed by moving the ejection head unit 51 in the main-scanning direction, then, the forming unit 5 is moved by one scan length in a sub-scanning direction (Y1 direction) and the next one scan area worth of forming process is performed, and one layer worth of forming process is performed by repeating the above one scan area worth of forming process. It should be noted that, after performing one layer worth of forming process of the forming layer 30, as shown in FIG. 31B, the forming unit 5 is returned to the upstream side of the sub-scanning direction.

Thereafter, in order to form the next forming layer 30 on the current forming layer 30, the forming stage 24 of the forming tank 22 is moved down by one layer worth of thickness in an arrow Z2 direction.

Next, as shown in FIG. 31B, the powder 20 is supplied to the forming tank 22 from a powder supplying apparatus (not shown). Further, the flattening roller 12 is rotated and at the same time moved along the stage surface of the forming stage 24 of the forming tank 22 in Y2 direction and the powder layer 31 with a predetermined thickness is formed on the forming layer 30 of the forming stage 24 (flattening).

Then, the liquid droplets of the forming liquid 10 are ejected from the head 50 of the ejecting head unit 51 and the next forming layer 30 is formed.

As described above, by repeating the forming process of the powder layer 31 and the curing process of the powder layer 31 by the ejection of the forming liquid 10, the forming layers 30 are sequentially laminated to image (produce) the three-dimensional object.

The present application is based on and claims the benefit of priority of Japanese Priority Application No. 2014-

187339 filed on Sep. 16, 2014 with the Japanese Patent Office, the entire contents of which are hereby incorporated by reference.

What is claimed is:

1. A method for forming a three-dimensional object, comprising:
   (a) supplying a powder to form a powder layer of particles; and
   (b) ejecting liquid droplets onto the powder layer to bond the particles of the powder layer to each other and to form a formed layer,
   two successive formed layers constituted by (i) the formed layer and (ii) another formed layer on which the formed layer is laminated in a laminating direction by the supplying and ejecting of (a) and (b), respectively, including (iii) a bonded area between the two successive formed layers, (iv) a vacant space between said two successive formed layers, (v) the vacant space being enclosed with the bonded area of the two successive formed layers, (vi) a powder density of the vacant space being lower than that of the bonded area, and (vii) the powder including at least two types of particles with different volume average particle diameter.

2. The method according to claim 1, wherein the liquid droplets are ejected in (b) such that a permeation depth of the liquid droplets into the powder layer is less than a thickness of the powder layer, said permeation depth less than the thickness of the powder layer causing the vacant space to be formed between the two successive formed layers.

3. The method according to claim 1, wherein the liquid droplets are ejected in (b) such that a permeation depth of the liquid droplets into the powder layer is less than a thickness of the powder layer and is equal to or greater than half of the thickness of the powder layer.

4. The method according to claim 1, further comprising ejecting additional liquid droplets onto another powder layer to form an additional formed layer on a further layer such that a permeation depth of the additional liquid droplets into said additional powder layer exceeds a thickness of the additional powder layer in order not to form between-layers vacant space between the additional formed layer and said further.

5. The method according to claim 1, wherein the vacant space is selectively arranged in the three-dimensional object.

6. The method according to claim 1, wherein no powder particles are present in the vacant space.

7. The method according to claim 1, further comprising sintering the three-dimensional object after the supplying, the ejecting, and the laminating.

8. The method according to claim 7, wherein the vacant space is maintained in the three-dimensional object even after the sintering is performed.

* * * * *